(12) United States Patent
Hager et al.

(10) Patent No.: US 7,098,841 B2
(45) Date of Patent: Aug. 29, 2006

(54) METHODS AND SYSTEMS FOR CONTROLLING A HEIGHT OF MUNITION DETONATION

(75) Inventors: James R. Hager, Golden Valley, MN (US); Glen Backes, Maple Grove, MN (US); Timothy J. Reilly, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 59 days.

(21) Appl. No.: 10/987,785

(22) Filed: Nov. 12, 2004

(65) Prior Publication Data

US 2006/0103570 A1    May 18, 2006

(51) Int. Cl.
F42C 13/04 (2006.01)
G01S 13/18 (2006.01)
G01S 13/16 (2006.01)

(52) U.S. Cl. .......................... 342/68; 342/61; 342/89; 342/94; 342/104; 342/118; 342/120; 342/175; 342/195; 102/206; 102/211; 102/214

(58) Field of Classification Search ................. 89/1.11; 102/206–220; 342/61–68, 89–103, 118, 342/134–145, 175, 189–197, 104, 105, 109–112, 342/114, 115, 120–122
See application file for complete search history.

(56) References Cited

U.S. PATENT DOCUMENTS

| | | | |
|---|---|---|---|
| 3,820,119 A * | 6/1974 | Casse et al. ................. 342/68 |
| 4,089,000 A * | 5/1978 | Bradford ..................... 342/68 |
| 4,118,702 A | 10/1978 | Rabinow | |
| 4,119,039 A * | 10/1978 | Wilkins et al. ............. 102/214 |
| 4,158,842 A * | 6/1979 | Clemens et al. ............. 342/68 |
| 4,170,008 A * | 10/1979 | Goebel et al. ................ 342/68 |
| 4,218,977 A * | 8/1980 | Kalmus ..................... 102/214 |
| 4,236,157 A * | 11/1980 | Goss et al. .................. 342/68 |
| 4,414,549 A * | 11/1983 | Wichmann ................... 342/68 |
| 4,421,007 A | 12/1983 | Hanes, Jr. | |
| RE33,055 E | 9/1989 | Labbé et al. | |
| 5,387,917 A * | 2/1995 | Hager et al. ................. 342/68 |
| 5,539,410 A * | 7/1996 | Zveglich ..................... 342/68 |
| 5,617,097 A * | 4/1997 | Gavnoudias ................ 342/68 |
| 5,682,164 A * | 10/1997 | McEwan ..................... 342/68 |
| 5,734,389 A * | 3/1998 | Bruce et al. ................. 342/68 |
| 5,753,851 A | 5/1998 | Jordan et al. | |

* cited by examiner

Primary Examiner—Bernarr E. Gregory
(74) Attorney, Agent, or Firm—Dina Khaled, Esq.; Armstrong Teasdale LLP

(57) ABSTRACT

A unit is described that is configured to control detonation of a munition such that the munition is detonated at a desired altitude. The unit includes a radar transmitter, a radar receiver that includes a radar range gate, and a sequencer. The sequencer is configured to receive a detonation altitude and set the range gate based on the received detonation altitude. The unit is also configured to output a detonation signal when radar return pulses received by the receiver aligned with gate delay pulses from the range gate.

31 Claims, 4 Drawing Sheets

METHODS AND SYSTEMS FOR CONTROLLING A HEIGHT OF MUNITION DETONATION

BACKGROUND OF THE INVENTION

This invention relates generally to controlling detonation of weapons, and more specifically, to methods and systems for controlling a height, or altitude, of munition detonation.

Conventional munitions dropped or launched from aircraft is either released with a high accuracy, or in large numbers, in order to effectively destroy a desired target. To achieve a high accuracy, it is frequently necessary to drop such munitions from an undesirably low altitude. However, dropping conventional munitions from a low altitude exposes the aircraft and crew to air defenses, for example, anti-aircraft artillery and surface-to-air missiles since. Alternatively, to deliver munitions in high numbers, it is frequently necessary fly an undesirably large number of missions which is expensive, time consuming, and exposes more aircraft and crew to air defenses.

To overcome these problems, smart munitions have been developed. Some smart munitions utilize a guidance and flight control system to accurately maneuver the munition to the desired target. The guidance system provides a control signal to control surfaces of the munition based upon the present position of the munition and the position of the target, so that the control surfaces cause the munition to maneuver toward the target. Such guidance systems typically utilize technologies such as laser guidance, infrared guidance, radar guidance, and/or satellite (GPS) guidance. However these systems are typically related to guiding the munition to a desired location, and are not typically related to detonation of the munition. Furthermore, such guidance systems are expensive and cannot affordably be incorporated into smaller munitions.

Ensuring that launched or dropped munitions detonate (e.g., explode) at the proper time is critical to success of a mission. Munitions meant for an underground target that detonate before penetrating the ground are less likely to destroy an intended target, and more likely to destroy or cause damage to unintended targets. Munitions that detonate at less than an intended detonation altitude is not likely to inflict the intended widespread, and possibly limited, damage. Rather, such a detonation is likely to result in severe damage to a smaller area. A detonation altitude is sometimes referred to as a height of burst.

BRIEF SUMMARY OF THE INVENTION

In one aspect, a unit configured to control detonation of a munition is provided such that the munition is detonated at a desired altitude. The unit comprises a radar transmitter, a radar receiver comprising a radar range gate, and a sequencer. The sequencer is configured to receive a detonation altitude and set the range gate based on the received detonation altitude. The unit is further configured to output a detonation signal when radar return pulses received by the receiver are aligned in time with a gate delay of the range gate.

In another aspect, a munition configured to detonate at a programmed altitude is provided. The munition comprises a unit configured to initiate detonation of the munition when a travel time for a transmitted signal to travel from the unit to the ground and back to the unit is substantially equal to a preset time.

In still another aspect, a method for detonating a munition at a selected detonation altitude is provided where the munition includes a radar transmitter and receiver. The method comprises providing the munition with a selected detonation altitude, configuring the munition to process radar signals to compare an actual altitude to the selected detonation altitude, and configuring the munition to initiate detonation if the actual altitude is substantially equal to the selected detonation altitude.

DETAILED DESCRIPTION OF THE INVENTION

Figure 1:
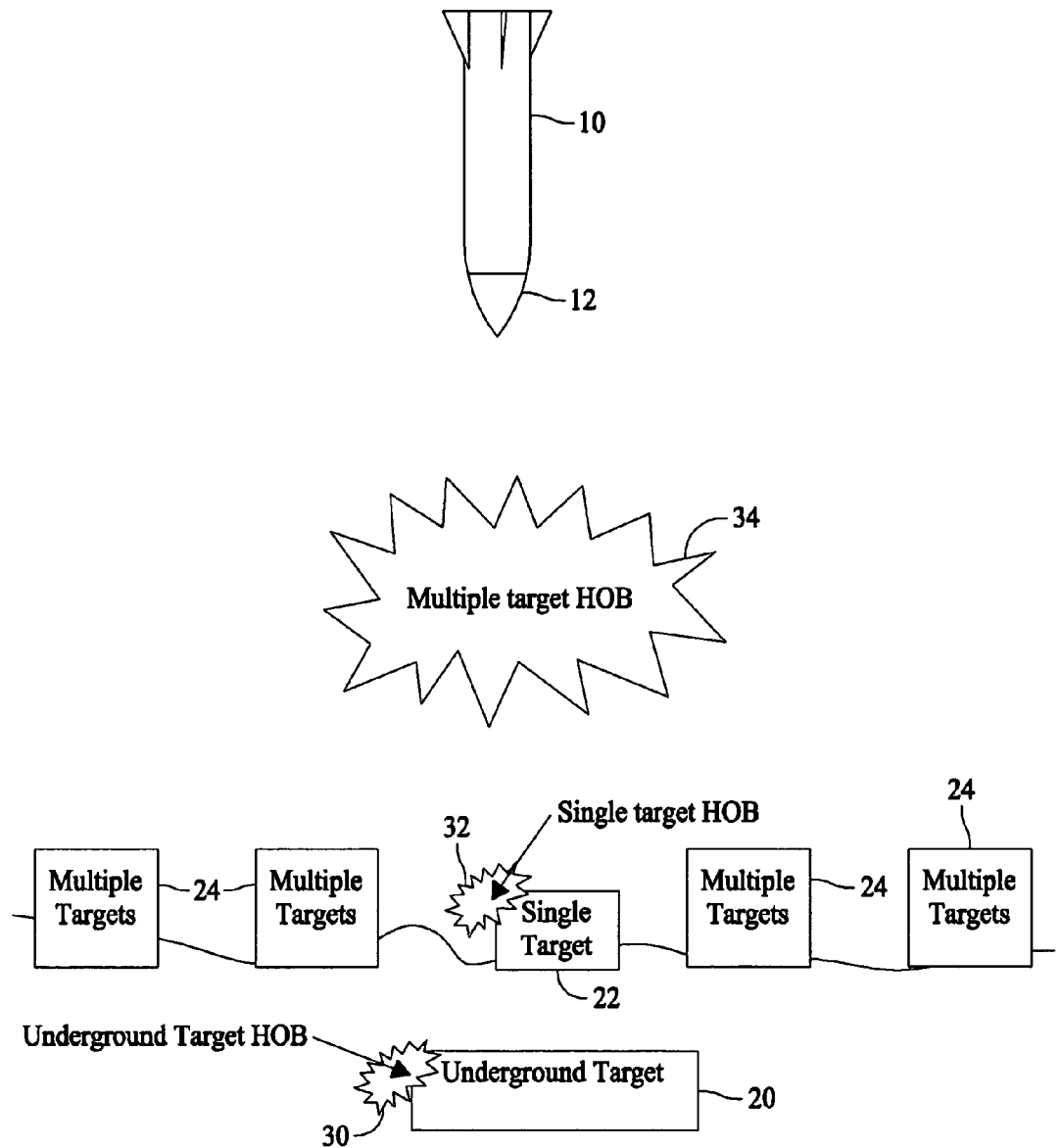
FIG. 1 illustrates various missions for a munition each of which incorporates a different detonation height for the munition.

FIG. 1 is a diagram illustrating a munition 10, for example, a bomb or missile, which includes an altitude sensor 12. Altitude sensor 12 is utilized in controlling a height of burst, or detonation altitude, of munition 10. Equipped with altitude sensor 12, munition 10 is configured for use in multiple missions. As illustrated in FIG. 1, munition 10 is configurable for use against an underground target 20, a single ground level target 22, and multiple ground level targets 24.

In one embodiment, munition 10 is configured with a detonation altitude (e.g., a height of burst (HOB)) prior to launch from an aircraft (not shown). The programmed detonation altitude enables detonation at the desired height above (or below) ground level dependent on the particular mission. If munition 10 is to be utilized against underground target 20, it is configured with an underground target detonation altitude (HOB) 30, such that munition 10 will not detonate until a predetermined time has passed after munition 10 is determined to be at a zero altitude. The predetermined time is substantially equal to time that it takes for munition 10 to travel from ground level to a position underground thought to be approximate underground target 20.

Similarly, if munition 10 is to be utilized against a single target 22, it is configured with a single target detonation altitude (HOB) 32, which is approximately the same altitude as single target 22. If munition 10 is to be utilized against multiple targets 24, it is configured with a multiple target detonation altitude (HOB) 34. The multiple target detonation altitude 34 is a detonation altitude above the altitude of the multiple targets 24 which has been determined to be substantially effective against most or all of multiple targets 24.

To carry out the above described multiple missions, sensor 12 has to be capable of detecting an altitude of munition 10 at altitudes at and above zero. In one embodiment, sensor 12 is a radar sensor that is configured to address known problems associated with the spacing between a transmit antenna and a receive antenna within the constraints of small bombs. More specifically, the radar sensor is configured to substantially eliminate the effects of the cross talk that occurs between radar transmit and receive antennas when spaced closely to one another and operating at lower altitudes.

Figure 2:
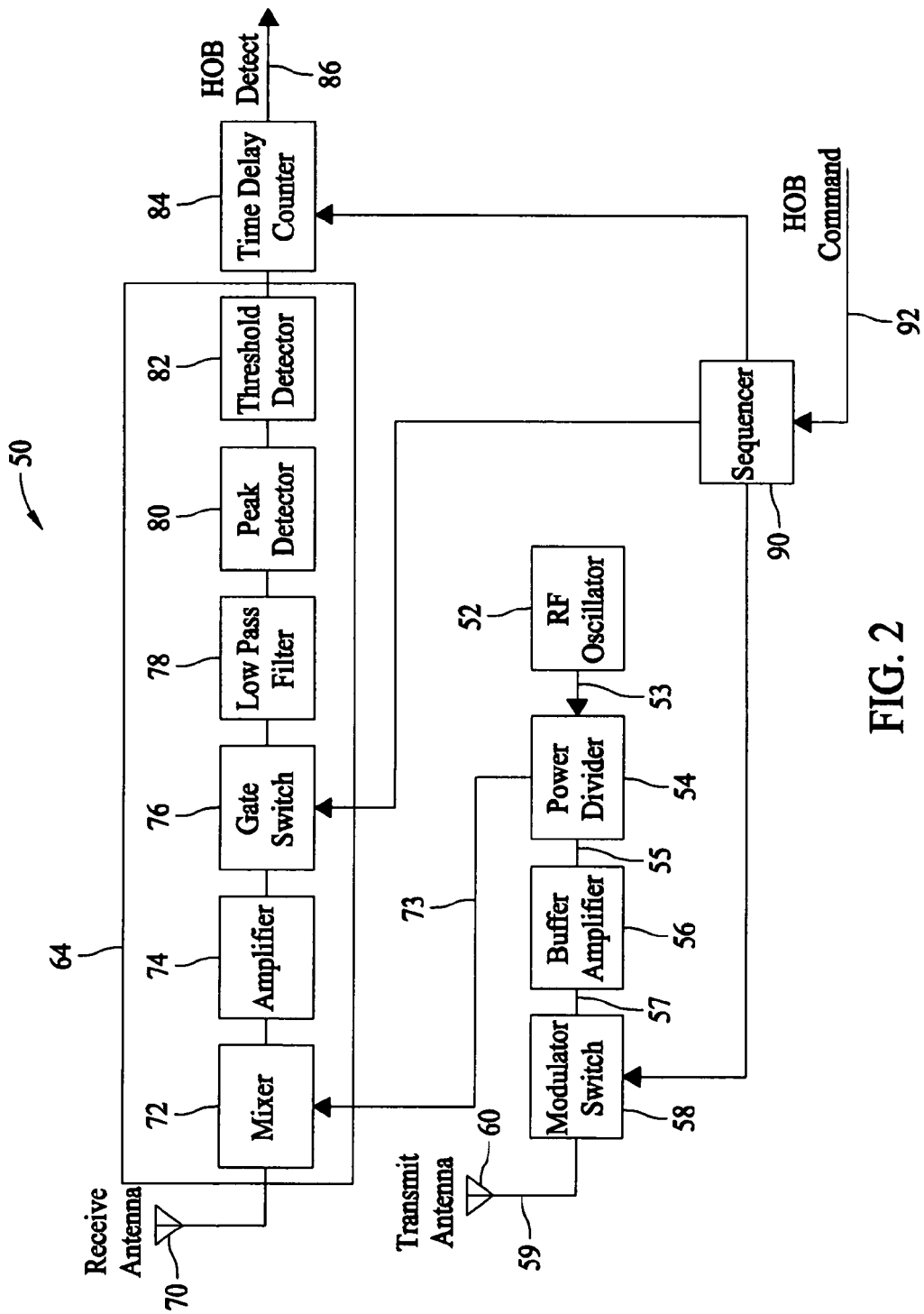
FIG. 2 is a block diagram of a radar unit for controlling a height at which the munition detonates.

FIG. 2 is a block diagram of a radar sensor 50 that is utilized for controlling a detonation altitude of a munition, for example, munition 10 (shown in FIG. 1). Radar sensor 50 includes an RF oscillator 52 that provides a frequency source for transmission and for down conversion of radar return pulses. More specifically, and with respect to transmission, RF oscillator 52 provides an RF frequency signal 53 to a power divider 54. Power divider 54 outputs a RF signal 55 to buffer amplifier 56, which outputs an amplified RF signal 57 for transmission. The amplified RF signal 57 for transmission is provided to a modulator switch 58, which, depending on a state of modulator switch 58, modulates the amplified RF signal and routes the modulated output signal 59 to transmit antenna 60 for transmission as a radar signal towards the ground.

Modulator switch 58 provides pulse modulation of amplified RF signal 57. Buffer amplifier 56 provides isolation to RF oscillator 52 from impedance variations caused by modulation switch 58. Such isolation reduces oscillator frequency pulling during transmission, to a tolerable level, which allows the radar signal return frequency to remain within a pass band of radar receiver 64. Oscillator load pulling is sometimes caused by load impedance changes present at an output of the oscillator. For example, as the impedance at the oscillator varies, the frequency of the oscillator varies somewhat. Referring to radar sensor 50, modulation switch 58 output impedance varies as the "switch" is opened and closed, which causes load pulling. Such load pulling can cause a problem in a radar if the transmit oscillator is also utilized as the frequency source for receiver down conversion. The difference between the frequency transmitted and the frequency used to down convert the return signal at the mixer, must be low enough such that the down converted return signal with its doppler shift plus any load pulling is within the bounds of the receiver bandwidth.

Radar signals transmitted utilizing transmit antenna 60 are reflected by the ground and received by receive antenna 70 as radar return pulses. Receive antenna 70 passes the received radar return pulses to a mixer 72 within radar receiver 64. Mixer 72 then down converts (demodulates) the radar return pulses based upon a signal 73 received from power divider 54 originating from RF oscillator 52. The down conversion provided by mixer 72 results in a Doppler frequency ($F_D$) signal that is proportional to a downward velocity (V) of munition 10. Stated mathematically, $F_D = 2V/\lambda$, where $\lambda$ is a wavelength of the radar. For example, for a velocity of 400 feet per second, and a radar frequency of 4.3 GHz (a wavelength 0.229 feet), the Doppler frequency is (2)(400)/0.229 or 3493 Hz at an output of mixer 72.

Amplifier 74 amplifies the Doppler frequency signal for further processing, and a gate switch 76 is activated at a time after transmission of the radar signal that is consistent with the preset detonation altitude. In other words, for a detonation altitude of 100 feet, gate switch 76 is configured to "look" for radar return signals at a time substantially equal to the time that it takes the transmitted radar signals to travel 200 feet (from transmit antenna 60 100 feet to ground and back 100 feet to receive antenna 70).

Received radar return signals that pass through gate switch 76 are received by low pass filter 78 which is configured with a filter bandwidth set as low as possible while remaining above a maximum expected Doppler frequency. Setting such a bandwidth for low pass filter 78 allows effective integration of as many radar return pulses as possible, thus maximizing sensitivity of radar receiver 64, while allowing for relatively low power transmissions from transmit antenna 60. A filtered radar return output from low pass filter 78 is peak detected utilizing peak detector 80 which results in a DC level signal that is input into threshold detector 82 and subsequently to time delay counter 84 which outputs a detonation signal 86.

A sequencer 90 controls operation of radar sensor 50 based on detonation altitude commands 92 received by sequencer 90 from an external system, for example, programming instructions received before munition 10 is launched or dropped from an aircraft. Sequencer 90 provides signals to modulation switch 58, gate switch 76, and time delay counter 84. More specifically, when a radar return time delay (due to altitude of munition 10) is equal to a gate delay at gate switch 76, as set by programmed sequencer 90, the signals representative of the radar return pulses are passed through gate switch 76 to threshold detector 82. Programmable sequencer 90 provides a capability to program a desired detonation altitude (or gate time delay) for munition 10 prior to launch.

For programmed detonations (height of bursts) that are at or above ground level, time delay counter 84 is set to a zero delay by sequencer 90, and gate switch 76 is set with a gate delay that is equal to a desired detonation altitude. As described above, one example of a gate delay is the time from transmission of a signal to an expected time for receipt of the reflection of the transmitted signal. For missions where ground penetration is required (e.g., an underground height of burst) gate switch 76 is set with a gate delay of zero and time delay counter 84 is set to a commanded (or preset) delay before it outputs detonation signal 86. The commanded delay results in detonation of munition 10 at a desired time after munition 10 passes zero altitude.

Figure 3:
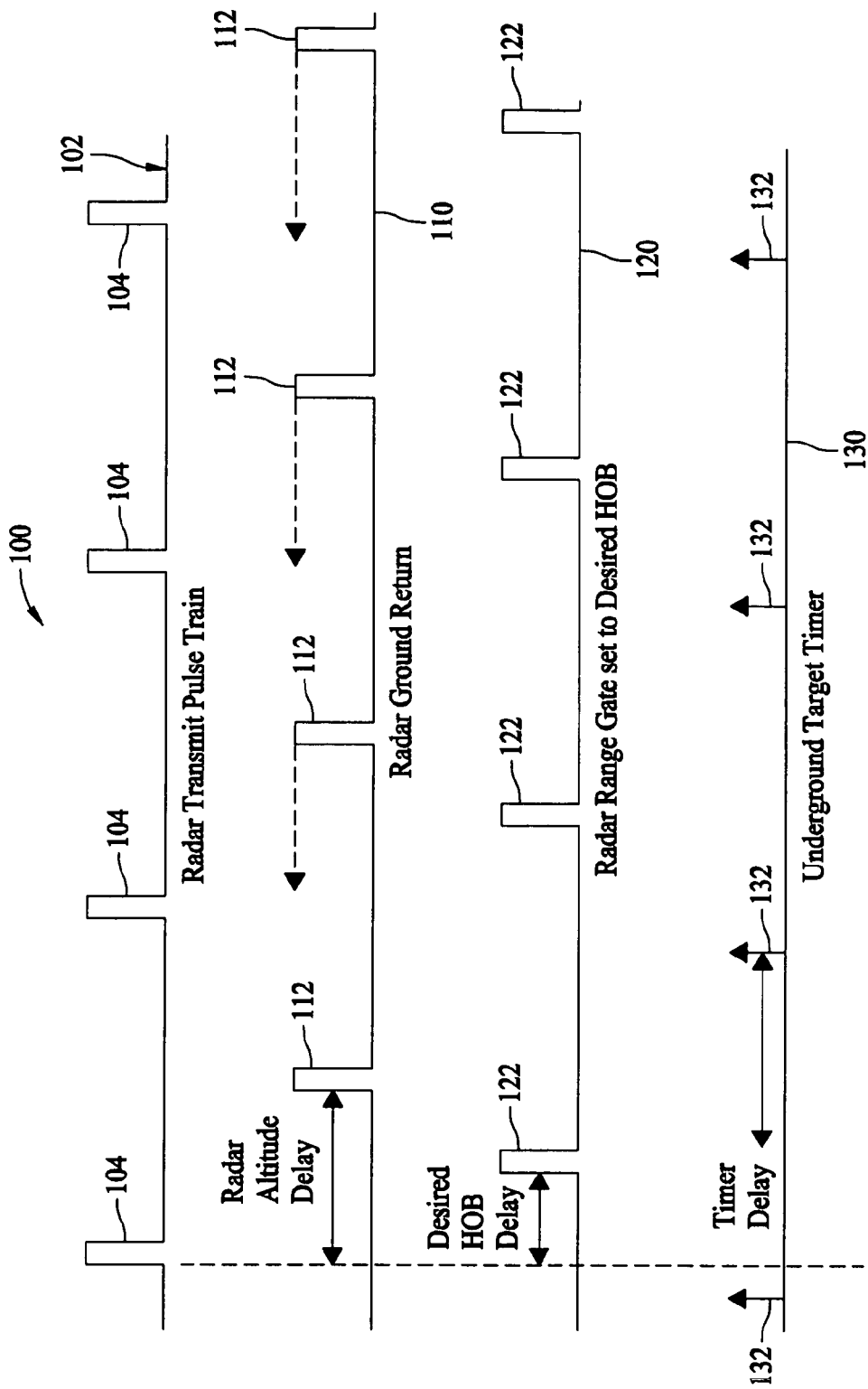
FIG. 3 is a timing diagram for the radar unit of FIG. 2.

FIG. 3 is a timing diagram 100 that illustrates the above described radar timing provided utilizing programmable sequencer 90. A transmit signal 102 includes evenly spaced radar transmit pulses 104 that have been transmitted from transmit antenna 60 (shown in FIGS. 2 and 3). Radar ground return pulses 110 are received by receive antenna 70 (shown in FIGS. 2 and 3) and represent transmit pulses that have been reflected by the ground. Each individual radar return pulse 112 is time delayed from its respective transmit pulse 104 based upon an altitude of munition 10, the time delay is sometimes referred to as a radar altitude delay. Therefore as munition 10 approaches the ground, the radar altitude delay decreases, as shown by the arrows extending from radar return pulses 112.

Radar range gate signal 120 is supplied to gate switch 76 from sequencer 90. Radar range gate signal 120 includes range gate pulses 122 that are time delayed from transmit pulses 104. The time delay is referred to herein as a gate delay. The gate delay between transmit pulses 104 and range gate pulses 122 is equal to a radar altitude delay at the desired detonation altitude. When radar return pulses 112 align in time with range gate pulses 122, due to decreasing altitude of munition 10, gate switch 76 switches "open", allowing signals representative of the radar return signals 112 to pass through. The passed radar return signals are then processed by low pass filter 78, peak detector 80, and threshold detector 82 as described above. When signals are output from threshold detector 82, based on the delay of time delay counter 84, munition 10 will detonate.

FIG. 3 further includes an example underground target timing signal 130 which includes timer delay pulses 132. Pulses 132 are representative of a programmed delay within time delay counter 84, delaying detonation of munition 10 until a preset time has elapsed after radar return signals have passed through range gate switch 76. The programmed delay is the time that munition 10 has to penetrate the ground for an underground target before detonation occurs.

Figure 4:
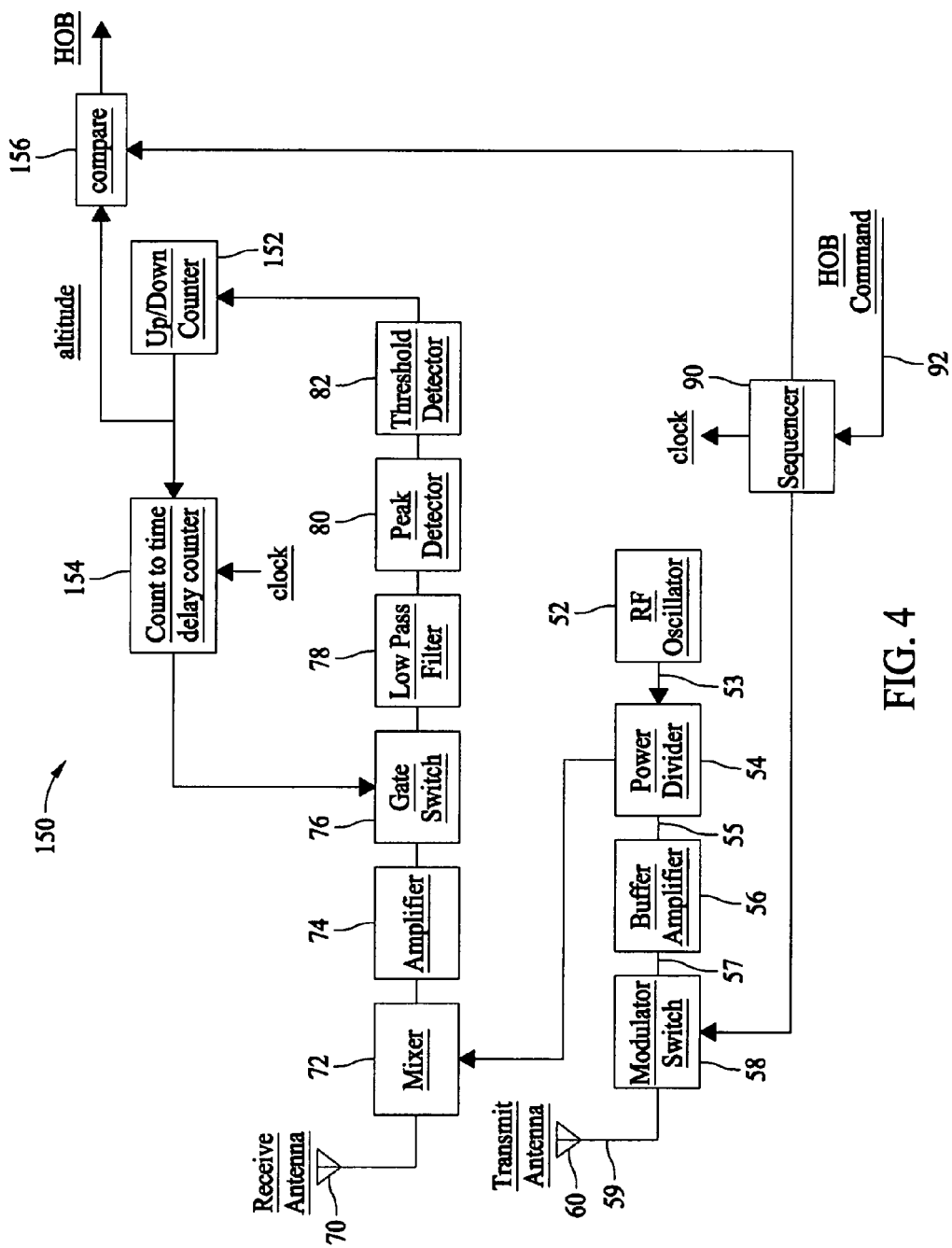
FIG. 4 is a block diagram of an alternative embodiment of radar unit for controlling a height at which the munition detonates.

FIG. 4 is a block diagram of an alternative embodiment radar sensor 150, which incorporates a closed loop altitude tracking function, that is utilized for controlling a detonation altitude of a munition, for example, munition 10 (shown in FIG. 1). The addition of the closed loop tracking function provides greater immunity to false alarms caused by interfering signals, for example, signals from radar jammers or other munitions operating at the same RF frequencies. Components of radar sensor 150 which are common with components of radar sensor 50 (shown in FIG. 2) are labeled utilizing the same reference numerals and will not be described further. To implement the closed loop altitude tracking function, radar sensor 150 includes an up/down counter 152 receiving the output from threshold detector 82. Counts output by up/down counter 152 are received by a time delay counter 154, which provides a timing signal to gate switch 76, and which receives a clock signal from sequencer 90. The output of up/down counter 152 is also applied to a comparitor 156 which also receives signals related to the desired detonation altitude from sequencer 90. When the counts from up/down counter 152 are equal to a desired count received from sequencer 90, comparitor 156 initiates the detonation process for munition 10.

More specifically, the closed loop altitude tracking function is configured to maintain the radar range gate setting on a leading edge of the radar return pulse. As munition 10 moves downward towards the ground, the radar return pulses move further into alignment with the setting of the radar range gate. As a result, a voltage output by gate switch 76 increases, thereby increasing the voltage applied to threshold detector 82. In the embodiment, threshold detector 82 is configured such that its output is equal to the threshold reference voltage minus the gated input voltage received from peak detector 80. Therefore, an increase in gated input voltage, due to munition 10 moving downward or inbound into the gate, above the threshold reference voltage, results in a down count command to up/down counter 102. Conversely, a gated input voltage below the threshold reference voltage, due to a radar return moving outbound to a higher altitude, results in an up count command to up/down counter 102.

In other words, as the altitude increases (not typical of a dropped munition), the gated input voltage input to threshold detector 82 decreases, and the up/down counter 102 counts up a count. The count output by output counter 102 is proportional to actual altitude in feet. As the altitude decreases, the gated input voltage increases, and up/down counter 102 counts down to a lower altitude. The counter is clocked, or updated, at a maximum rate desired to run the closed loop altitude tracking function.

Count to time delay counter 104 is enabled by a command that is in sync with a leading edge of transmit pulses transmitted by radar sensor 150. The clock input to count to time delay counter 104 is at a frequency dependent on the desired gate position resolution. For example, a 100 MHz clock provides a ten nanosecond period, which is equivalent to a length of time it takes a radar pulse to travel five feet, which results in a radar range gate positioning resolution of five feet. Therefore, if up/down counter 102 counts down one count in response to the altitude decreasing, count to time delay counter 104 outputs a timing signal to gate switch 76 ten nanoseconds (five feet earlier or lower in altitude) sooner following the transmit pulse. The result is that the gate of gate switch 76 moves inbound ten nanoseconds or five feet.

Applying the above description to an example dropped munition with a five foot gate position resolution, the clock input to count to time delay counter 104 is ten nanoseconds or 100 MHz. For a desired track rate of 2000 feet/second, 2000/5 ft is equal to 400 updates to count to time delay counter 104 per second, which indicates a clock rate of 400 Hz for up/down counter 102. Assuming an altitude of 200 feet, an output of up/down counter 102 is 200/5, or 40 inputs to count to time delay counter 104. At 100 MHz, 40 counts is 400 nanoseconds, or a 200 feet gate position with respect to the radar transmit pulses. If the desired detonation altitude is 10 feet, the input to comparitor 106 from sequencer 90 is set to two, when up/down counter counts down to two (10 feet), the output of comparitor 106 is set high, causing detonation of munition 10.

In order to provide detonation of munition 10 at and very near a zero altitude, without interference from antenna leakage between transmit antenna 60 and receive antenna 70, separation between transmit antenna 60 and receive antenna 70 has to be large enough that an antenna leakage signal is lower than the weakest expected ground return at low altitudes. Historically, with smaller munitions, as represented by munition 10, antenna separation between a transmit antenna and a receive antenna has been too small to ensure that return signals resulting from antenna leakage have an amplitude below the weakest expected radar return signal reflected from the ground. However, through utilization of pulse modulated radar signals, radar sensor 50 provides reliable operation down to a zero altitude with a much smaller spacing between radar transmit and receive antennas than previously possible.

If munition 10 is not changing altitude, the output of mixer 72 is a DC signal (e.g., a zero Hz signal) which is indicative of interference based on antenna leakage. In other words, mixer 72 operates as a phase detector to signals with the same frequency. By varying the phase of a local oscillator signal within mixer 72, the level of the DC signal from mixer 72 is also varied. In one embodiment, the DC signal from mixer 72 is set to a zero altitude within radar receiver 50 by setting a transmission line length from power divider 54 to mixer 72 to provide a 180 degree phase shift with respect to a leakage path length between transmit antenna 60 and receive antenna 70.

Since the undesired antenna leakage has no doppler shift (the ground return includes a Doppler shift since the antenna is moving towards the ground), the antenna leakage signal is at the same frequency as the signal from RF oscillator 52 which is applied to mixer 72. This results in aDC pulse the amplitude of which represents the phase difference between the signal from RF oscillator 52 and the antenna leakage signal received at mixer 72. A typical wavelength at one operating frequency is about 2¾ inches, for example, and lengthening the path length from power divider 54 to mixer 72 to about that wavelength results in a 360 degree phase change, and a 180 degree shift is obtained with a 1⅜ inch path length from power divider 54 to mixer 72.

Within munition 10, the phase of the undesired antenna leakage with respect to RF oscillator 52 is dependent on the respective path lengths to mixer 72. For example, if the antenna leakage path length is an integer multiple of wavelengths longer than the path from RF oscillator 52 to mixer 72, the two signals arrive at mixer 72 in phase with one another, resulting in a zero degree phase difference and a zero volt signal out of mixer 72, resulting in a minimum interference with the desired return signal at low altitudes. However, if the paths vary by, for example, one-half wavelength, or 180 degrees, a maximum amplitude will result at the output of mixer 72 during the time of transmission, resulting in maximum interference to the desired low altitude return signal.

Radar receivers 50 and 150 are both low cost and small in size through the incorporation of a single frequency oscillator design which provides both the frequency source for transmission of radar signals and the frequency source for down conversion of received radar signals. The transmission portion of radar receiver 50 is low power, which also results in low cost and size. The transmission portion of radar receivers 50 and 150, through incorporation of the single oscillator, takes advantage of positive ground return Doppler shifts associated with downward motion of munition 10. In addition, operation down to a zero altitude is achievable with a small antenna spacing through phase cancellation of the transmit to receive antenna leakage interference.

While the invention has been described in terms of various specific embodiments, those skilled in the art will recognize that the invention can be practiced with modification within the spirit and scope of the claims.

The invention claimed is:

1. A unit configured to control detonation of a munition such that the munition is detonated at a desired altitude, said unit comprising:
    a radar transmitter configured to transmit radar pulses;
    a radar receiver comprising a radar range gate; and
    a sequencer configured to receive a detonation altitude from an external system, said sequencer configured to set said range gate based on the received detonation altitude, said unit configured to output a detonation signal to the munition when radar return pulses received by said receiver align with gate delay pulses set within said range gate.

2. A unit according to claim 1 wherein said transmitter comprises an oscillator and said receiver comprises a mixer, said mixer configured to receive a signal originating from said oscillator, said signal utilized by said mixer for down conversion of received radar return pulses.

3. A unit according to claim 2 wherein said mixer is configured to output a Doppler frequency signal representative of a velocity of the munition.

4. A unit according to claim 1 wherein said mixer comprises a local oscillator comprising an output, said mixer configured to vary a phase of said local oscillator output to vary a DC output of said mixer.

5. A unit according to claim 4 comprising a transmission line, said transmission line configured to couple said mixer to the signal originating from said oscillator, a length of said transmission line configured to provide an approximate 180 degree phase shift with respect to a leakage path between an antenna of said radar transmitter and an antenna of said radar receiver.

6. A unit according to claim 1 wherein said transmitter comprises a modulation switch, said modulation switch configured to output a modulated radar signal based upon an input from said sequencer.

7. A unit according to claim 1 further comprising a time delay counter, said time delay counter configured to receive a signal from said radar receiver indicating said munition is at the detonation altitude, and further configured to output a detonation signal, based on a detonation delay time command from said sequencer.

8. A unit according to claim 7 wherein said sequencer is configured to output a zero detonation delay time command to said time delay counter when the detonation altitude is zero or greater.

9. A unit according to claim 7 wherein said sequencer is configured to output a detonation delay time command based on a time estimate for said munition to travel from a zero altitude to a desired altitude below ground level when the detonation altitude is below zero.

10. A unit according to claim 7 wherein said radar receiver comprises a threshold detector, said threshold detector configured to output the signal to said time delay counter, the signal being a voltage, a level of the voltage adjusted according to an amount of alignment between the received radar returns and the gate delay pulses set within said range gate.

11. A unit according to claim 1 wherein said radar receiver comprises a threshold detector receiving a voltage originating from said radar range gate, a level of the voltage based on an amount of alignment between the received radar returns and the gate delay pulses set within said range gate.

12. A unit according to claim 11 further comprising an up/down counter configured to count based on a received output from said threshold detector.

13. A unit according to claim 12 wherein said up/down counter is configured to down count when the received output from said threshold detector is based upon the voltage from said radar range gate being greater than a threshold voltage set for said threshold detector.

14. A unit according to claim 13 further comprising a comparitor, said comparitor configured to receive a count from said sequencer representative of a detonation altitude and further configured to receive counts from said up/down counter, said comparitor configured to output the detonation signal when the received counts are equal.

15. A unit according to claim 13 further comprising a count to time delay counter, said count to time delay counter synchronized with a leading edge of transmit pulses output by said radar transmitter.

16. A unit according to claim 15 wherein said count to time delay counter is configured to receive counts from said up/down counter, said count to time delay counter configured to set a position of said range gate based on counts received from said up/down counter.

17. A unit according to claim 16 wherein a count is proportional to a resolution of said range gate.

18. A munition configured to detonate at a programmed altitude, said munition comprising:
    a radar transmitter configured to transmit a signal;
    a radar receiver; and
    a unit configured to initiate a detonation signal within said munition when a travel time for a transmitted signal to travel from said radar transmitter to the ground and back to said radar receiver is substantially equal to a preset time.

19. A munition according to claim 18 wherein said radar receiver comprises a radar range gate; and
    said unit comprises a sequencer configured to set said range gate with a delay time that is substantially equal to the travel time for the transmitted signal to travel from said radar transmitter to the ground and back to said radar receiver, the travel time based on the programmed detonation altitude.

20. A munition according to claim 18 wherein said unit is configured to output a detonation signal when the transmitted signals are received during the delay time of said range gate.

21. A munition according to claim 19 wherein said radar receiver comprises a mixer comprising a local oscillator, said mixer configured to vary a phase of an output of said local oscillator to vary a DC output of said mixer.

22. A munition according to claim 21 comprising a transmission line, said transmission line configured to couple said mixer to a signal originating from said oscillator, a length of said transmission line configured to provide an approximate 180 degree phase shift with respect to a leakage path between an antenna of said radar transmitter and an antenna of said radar receiver.

23. A munition according to claim 19 further comprising a time delay counter, said time delay counter configured to receive a signal from said radar receiver indicative of said munition being at the detonation altitude, and further configured to output a detonation signal, based on a detonation delay time received from said sequencer.

24. A munition according to claim 23 wherein said sequencer is configured to output a zero detonation delay time command to said time delay counter when the detonation altitude is zero or greater and output a detonation delay time command based on a time estimate for said munition to travel from a zero altitude to a desired altitude below ground level when the detonation altitude is below zero.

25. A munition according to claim 19 wherein said radar receiver comprises a threshold detector, said munition further comprising:
    a sequencer configured to receive a signal representative of a desired detonation altitude;
    an up/down counter configured to count based on a received output from said threshold detector;
    a comparitor, said comparitor configured to receive a count from said sequencer representative of a detonation altitude and further configured to receive counts from said up/down counter, said comparitor configured to output the detonation signal when the received counts are equal.

26. A muntion according to claim 25 further comprising a count to time delay counter, said count to time delay counter synchronized with a leading edge of transmit pulses output by said radar transmitter, said count to time delay counter configured to receive counts from said up/down counter, said count to time delay counter configured to set a position of said range gate based on counts received from said up/down counter.

27. A method for detonating a munition at a selected detonation altitude, the munition including a radar transmitter and receiver, said method comprising:
    providing the munition with a selected detonation altitude;
    configuring the munition to process radar signals to compare an actual altitude to the selected detonation altitude; and
    configuring the munition to generate a detonation signal if the actual altitude is substantially equal to the selected detonation altitude.

28. A method according to claim 27 wherein said programming the munition comprises providing the detonation altitude to a sequencer within the radar.

29. A method according to claim 27 wherein said configuring the munition to process radar signals further comprises:
    configuring a sequencer to modulate radar signals for transmission; and
    configuring the sequencer to set a delay time for a radar gate switch within the radar receiver; and
    outputting a signal from the gate switch when a time between transmission of a radar signal and reception of the radar signal is substantially equal to the delay time of the radar gate switch.

30. A method according to claim 29 wherein said configuring the munition to initiate detonation comprises delaying detonation after the signal is received from the gate switch according to a desired detonation altitude.

31. A method according to claim 27 wherein said configuring the munition to process radar signals comprises:
    varying a phase of a local oscillator output in the radar transmitter to vary a DC output of a mixer in the radar receiver; and
    setting a length of a length of a transmission line between the local oscillator and the mixer to provide an approximate 180 degree phase shift with respect to a leakage path between an antenna of the radar transmitter and an antenna of the radar receiver.

* * * * *